United States Patent [19]

Knight

[11] 4,285,917

[45] Aug. 25, 1981

[54] METHOD FOR REMOVAL OF HYDROGEN SULFIDE FROM SOUR GAS STREAMS

[75] Inventor: Stuart R. Knight, San Diego, Calif.

[73] Assignee: Bayside Holding Corp., Paramount, Calif.

[21] Appl. No.: 174,193

[22] Filed: Jul. 31, 1980

[51] Int. Cl.$^3$ .................. B01D 53/34; F25J 3/00; F01K 25/14

[52] U.S. Cl. .................. 423/224; 423/220; 423/244; 55/23; 55/68; 55/73; 62/11; 60/648; 60/204

[58] Field of Search .............. 423/210, 220, 224, 230, 423/244 A, 542, 555; 55/23, 68, 73; 62/11; 60/648, 651, 671, 39.12, 2

[56] References Cited

U.S. PATENT DOCUMENTS

| | | | |
|---|---|---|---|
| 3,989,478 | 11/1976 | Jones | 55/23 X |
| 4,082,146 | 4/1978 | Compton et al. | 423/224 X |
| 4,126,000 | 11/1978 | Funk | 60/648 |
| 4,169,133 | 9/1979 | Staege | 423/220 X |

Primary Examiner—Earl C. Thomas

Attorney, Agent, or Firm—Fulwider, Patton, Rieber, Lee & Utecht

[57] ABSTRACT

A cost effective and environmentally acceptable method for removal of hydrogen sulfide from sour gas streams associated with source materials such as geothermal and petrochemical energy sources. The method comprises the steps of scrubbing inert, non-combustible components such as carbon dioxide from the sour gas, flowing the remaining combustible gas for further processing including compression, cryogenic liquifaction, and expansion to segregate hydrogen sulfide and gaseous components having a similar critical temperature from "clean" combustible gaseous components. The hydrogen sulfide and gaseous components of similar critical temperatures are then disposed of by ignition in a heat exchanger and fluidized bed scrub, converting hydrogen sulfide to sulfur dioxide which is scrubbed from the exhaust before release to the atmosphere. The clean combustible gaseous components are combusted and utilized to drive generators thereby providing a net energy output for the inventive abatement scheme.

10 Claims, 1 Drawing Figure

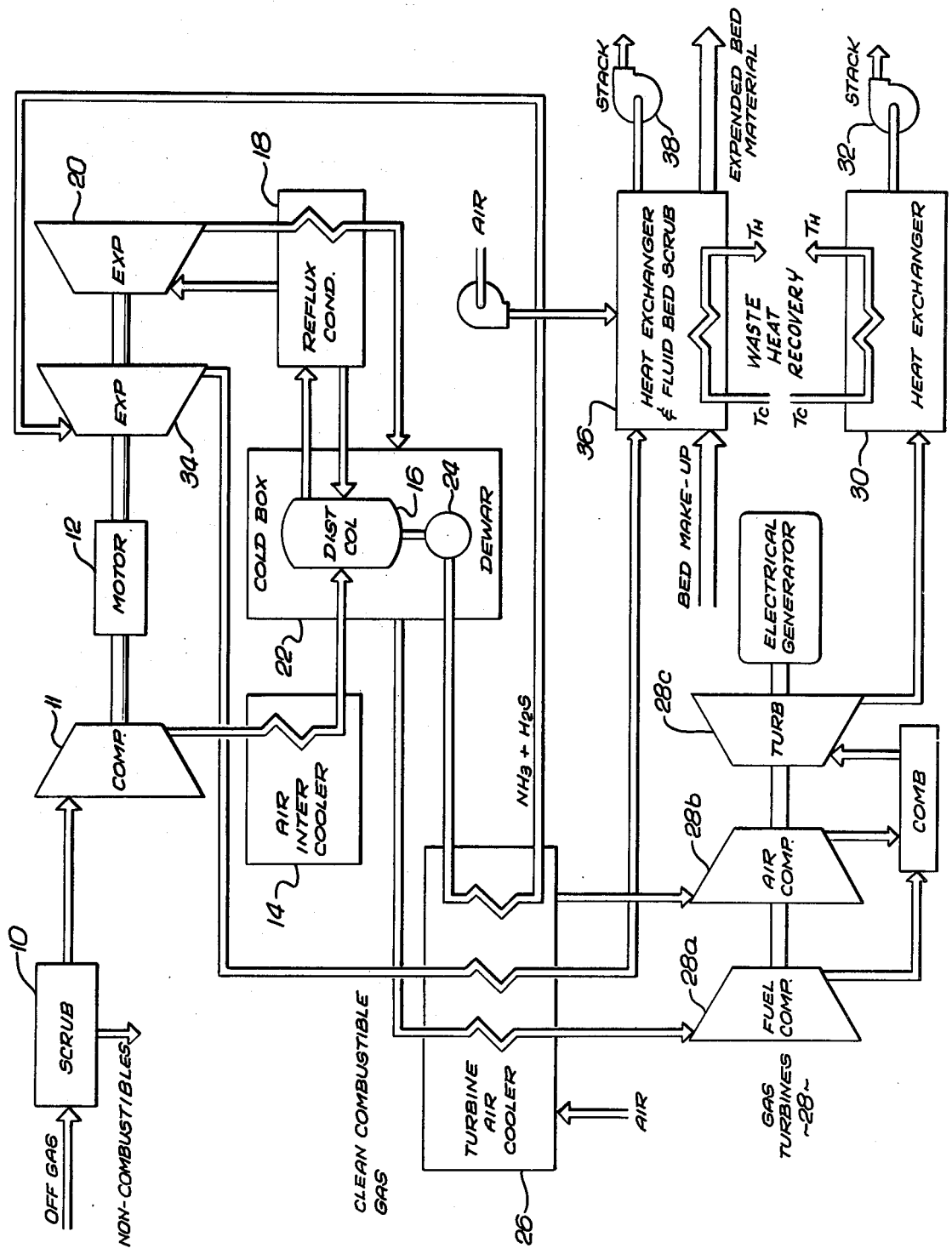

METHOD FOR REMOVAL OF HYDROGEN SULFIDE FROM SOUR GAS STREAMS

BACKGROUND OF THE INVENTION

The present invention relates to a cost effective and environmentally acceptable method for removal of hydrogen sulfide ($H_2S$) from so-called "sour gas".

Reduction or elimination of undesirable by-products associated with source materials such as refinery, natural gas and geothermal energy sources, have been generally treated as an expenditure in the context of the overall operation and a technical problem for the pollution control engineer. Hydrogen sulfide, the particular pollutant addressed by the method of the present invention usually has relatively little commercial value and often represents a secondary disposal problem after removal from a primary process stream. While release of low level $H_2S$ emissions into the atmosphere have been acceptable in the past, many modern governmental pollution control agencies continue to adopt more stringent standards, making further $H_2S$ abatement mandatory.

Many conventional hydrogen sulfide abatement processes pose secondary or technical problems which make the abatement process both costly and difficult to maintain in operation.

One such conventional abatement scheme known as the "Stretford" process is used to treat non-condensable off-gas streams. The Stretford process uses an alkaline scrubbing solution generally containing a vanadium catalyst so that hydrogen sulfide is both absorbed into a scrubbing solution and also oxidized to form sulfur in an oxidation-reduction reaction involving the vanadium component of the scrubbing solution. Although the "Stretford" process is extremely efficient in the removal of $H_2S$ from off-gas, the process is relatively costly and complex in nature, requiring various chemical solutions to be introduced in the process stream and frequent monitoring for proper operation by technical personnel.

Accordingly, those skilled in the art concerned with hydrogen sulfide removal and abatement from sour gas streams have recognized a significant need for reducing $H_2S$ content to an acceptable level without costly expenditure.

SUMMARY OF THE INVENTION

The present invention provides a unique cost effective method which is capable of processing any sour gas stream containing hydrogen sulfide, combustible, and non-combustible components to reduce the initial concentration of hydrogen sulfide to an environmentally acceptable level.

Briefly and in general terms, the method in accordance with the invention comprises the steps of: (a) scrubbing a majority of the non-combustible gaseous components from the sour gas stream; (b) compressing the remainder of the stream derived from step (a) to a pressure within a range of from about 230 psia to about 250 psia; (c) effecting a separation by cryogenic liquifaction of hydrogen sulfide and gaseous components of similar critical temperature from the stream derived from step (b) and storing the separated hydrogen sulfide and gaseous components of similar critical temperature in an insulated storage vessel; (d) expanding the unstored remainder of the stream derived from step (c) in an adiabatic manner to substantially recover available work of compression from the stream; (e) combining the expanded stream derived from step (d) with air and effecting combustion thereof in a combustion unit whereby resultant energy is utilized to drive a gas turbine engine; (f) flowing the stored hydrogen sulfide and gaseous components of similar critical temperature derived from step (c) through an expander to substantially recover available work of compression; and (g) combining the expanded hydrogen sulfide and gaseous components of similar critical temperature derived from step (f) with air and effecting combustion thereof in a combustion unit having a fluidized bed scrub, to substantially convert hydrogen sulfide to sulfur dioxide and to scrub the sulfur dioxide from resultant combustion gases. The net energy output from the system is dependent upon the total quantity of clean, combustible gas available from the off-gas supply.

The above and other objects and advantages of this invention will become apparent from the following more detailed description, when taken in conjunction with the accompanying drawing of an illustrative embodiment.

BRIEF DESCRIPTION OF DRAWING

The FIGURE is a schematic flow diagram of a system for hydrogen sulfide removal from a sour gas steam, in accordance with a preferred embodiment of the present invention.

DESCRIPTION OF THE PREFERRED EMBODIMENT

The present invention provides a unique cost effective method which is capable of processing any gas stream containing hydrogen sulfide ($H_2S$), so-called "sour gas" or "off gas", to reduce the initial $H_2S$ concentration to an environmentally acceptable level. Such gases are, for instance, associated with geothermal and petrochemical source materials and particularly in process streams involving purification of natural gas, petroleum and coal-coking operations.

In accordance with the invention, it has been determined that a combinatin of cryogenic, gas turbine and fluid bed technology, can be utilized to produce an added power generation capability derived from the off-gas stream, thereby turning a hydrogen sulfide abatement requirement into an asset. Moreover, a relatively difficult abatement problem concerning $H_2S$, becomes a relatively simpler one involving sulfur dioxide ($SO_2$) removal which is generally considered to be better understood and proven technologically by those skilled in the art. In this respect, industry is currently utilizing a number of suitable schemes for $SO_2$ scrubbing including use of fluid bed scrubbing/heat exchange methods. These methods are preferred as the most reliable and efficient approach to $SO_2$ abatement possessing superior heat exchange rates. Other available $SO_2$ scrubbing schemes, of course, can also be utilized.

The invention provides a method for removal of hydrogen sulfide from a sour gas stream containing hydrogen sulfide, combustible and non-combustible gaseous components, the method comprising the steps of: (a) scrubbing a majority of the non-combustible gaseous components from the sour gas stream; (b) compressing the remainder of the stream derived from step (a) to a pressure within a range of from about 230 psia to about 250 psia; (c) effecting a separation by cryogenic liquifaction of hydrogen sulfide and gaseous components of similar critical temperature, from the stream derived from step (b) and storing the separated hydrogen sulfide and gaseous components of similar critical temperature in an insulated storage vessel; (d) expanding the unstored remainder of the stream derived from step (c) in an adiabatic manner to substantially recover available work of compression from the stream; (e) combining the expanded stream derived from step (d) with air and effecting combustion thereof in a combustion unit whereby resultant energy is utilized to drive a gas turbine engine; (f) flowing the stored hydrogen sulfide and gaseous components of similar critical temperature derived from step (c) through an expander to substantially recover available work of compression; and (g) combining the expanded hydrogen sulfide and gaseous components of similar critical temperature derived from step (f) with air and effecting combustion thereof in a combustion unit having a fluidized bed scrub, to substantially convert hydrogen sulfide to sulfur dioxide and to scrub the sulfur dioxide from resultant combustion gases.

The method of the present invention is particularly effective in connection with geothermal and petrochemical sources associated with sufficient overall quantities of off-gas, that combustion utilization of the off-gas is a sound technical approach to $H_2S$ abatement problem. Combustion of the off-gas to purely dispose of it will oxidize the $H_2S$ component thus resulting in $SO_2$. This change, in and of itself, considerably simplifies the pollution control problem in light of suitable existing $SO_2$ abatement schemes.

In more detail, off-gas, for instance, produced at a geothermal energy site known as the Gesyers, on the average initially comprises about 6% $H_2S$, about 18% $CH_4$, about 20% $H_2$ and about 50% $CO_2$.

Referring now to the FIGURE which illustrates a preferred embodied method, the off-gas is first flowed through a scrubbing section 10 of the process where direct contact is effected with a scrubbing solution designed to remove a majority of inert or non-combustible gas, such as carbon dioxide ($CO_2$), from the stream. Removal of non-combustible gaseous components in the scrubbing section 10 should be accomplished with highest possible efficiency to optimize the energy output of the total hydrogen sulfide abatement process.

Of course, those skilled in the art will readily appreciate that other available scrubbing means such as molecular sieves and the like may also be utilized for removal of non-combustion components from the off-gas.

From the scrubbing section 10, the remaining off-gas, now rich in combustibles, is flowed to a compressor 11, where the gas is raised in pressure, for separation of hydrogen sulfide ($H_2S$) and gaseous components of similar critical temperature from the remaining gas content.

In this respect, amonia ($NH_3$) may also be present in the off-gas composition, and it will therefor be necessary to cryogenically separate the ammonia ($NH_3$) and the hydrogen sulfide ($H_2S$) as a combination liquid due to their critical temperatures being in close proximity to one another.

To provide the differential horsepower required for compression of incoming gas as compared to the work exerted during expansion stages of both hydrogen sulfide ($H_2S$) stream and clean, combustible gas stream comprising $H_2$, $CH_4$, $N_2$ and the like, an electrical motor 12 may be coupled into the mechanical drive train of the compression/expansion system. The horsepower requirement of this device will be dictated by total gas flow and critical pressure requirements for compression of the incoming gas stream.

After compression of the gas, the mixture is passed through an air intercooler 14 which cools the gaseous mixture for effecting separation of $H_2S$ and components of similar critical temperature from the remainder of the stream. From the intercooler 14 resulting gas-liquid mixture flows to a distillation column 16 where passage upward through the column provides segregation of the liquified hydrogen sulfide ($H_2S$) and components of similar critical temperature. The remaining off-gas is passed to a reflux condenser 18 to complete separation and liquification of hydrogen sulfide ($H_2S$) and any other gas component having similar critical temperature, such as ammonia ($NH_3$). The resultant liquid is thereafter returned to the distillation column 16.

From the reflux condenser 18 remaining gas, such as hydrogen ($H_2$), methane ($CH_4$) and nitrogen ($N_2$), is flowed to an expander 20 where part of the work of compression is reclaimed in an adiabatic fashion. The exhaust from the expander 20 then is isentropically expanded through the reflux condenser 18 and subsequently flowed in an isentropic manner through a cold box 22 providing the necessary cooling for both the distillation column 16 and a dewar storage vessel 24 where the liquid hydrogen sulfide ($H_2S$) and other liquified gases, such as ammonia ($NH_3$), are maintained in their liquid state by the lower temperature regime.

The "clean" combustible gas mixture is then flowed through a turbine inlet air cooler 26 to isentropically recover the remaining energy of compression. The clean combustible gas mixture is then flowed to gas turbines 28, where the mixture passes through a fuel compressor 28a. Air from the turbine air cooler is passed through an air compressor 28b and then fed to a combustion chamber where the gas-air mixture is ignited. The energy derived from combustion is utilized to drive a gas turbine engine 28c, which is coupled to an electrical generator.

A combination of power generation equipment, such as gas turbines 28, is totally dependent on quantity and BTU content of the clean combustible gas stream.

Safety considerations and/or regulatory mandate may require that the clean, combustible gas stream from the reflux condenser 18 be directly flowed to the turbine inlet air cooler 26 without passing through the cold box 22. Alternate cooling of the cold box 22 may be achieved by any number of means, such as mechanical refrigeration, use of liquid nitrogen ($N_2$), and the like.

Exhaust from the turbines 28 is then passed through a waste heat exchanger 30 to recover the maximum amount of energy possible in the specific application. Exhaust from the waste heat exchanger 30 is then conducted via stack 32 to the atmosphere.

Disposal of the hydrogen sulfide ($H_2S$) and gas of similar critical temperatures from dewar storage 24 is then accomplished by flowing the liquid product from the dewar storage 24 through the turbine inlet air cooler 26, recovering part of the compression energy and causing the liquid mixture to flash back to its gaseous state.

The gaseous mixture containing $H_2S$ is then flowed through an expander 34 to recover more of the compression work, and subsequently flowed to the turbine inlet air cooler 26 for expansion to thereby recover the remaining work of compression. The exit gas is finally flowed to a heat exchanger and fluidized bed scrubber combustion unit 36 and mixed with air and ignited.

The removal of the sulfur dioxide ($SO_2$) which results from combustion of $H_2S$ is accomplished by flowing the combustion gases through a limestone, dolomite or similar bed material contained within the combustion unit 36. Optionally, a waste heat exchanger or bottoming cycle may be incorporated in the combustion unit 36, if desired.

The temperatures in the fluid bed combustion unit 36 should be held in an optimum range for maximum capture of sulfur dioxide ($SO_2$), thereby minimizing release of sulfur dioxide ($SO_2$) to the atmosphere. This temperature is dictated by a combination of process parameters including bed material selection, bed depth and fluidizing gas velocity. In this regard, the temperature range in the combustion unit 36 has been determined to be between 1400° F. to 1700° F. for a bed material such as anhydrous lime or magnesium oxide having a bed depth of about 36 inches and a fluidizing gas velocity of about 1½ ft/sec.

The exit gases from the combustion unit 36 are then routed to stack 38 for exhaust to the atmosphere with sulfur dioxide ($SO_2$) content meeting the requirements of federal and state regulations for air pollution.

Of course those skilled in the art will readily appreciate that it is mandatory that the moisture level in the incoming gas stream be reduced as low as practicable by drying, for instance, to less than about 1%, to prevent formation of acidic compounds in the liquid phases of the processes.

The following example will serve to illustrate the inventive method in accordance with a preferred embodiment.

EXAMPLE

A supply of off-gas comprising hydrogen sulfide, ammonia, hydrogen, methane, nitrogen and carbon dioxide, is first flowed to a scrubbing unit at a flow rate of about 86,730 lbs. per hr., pressure of about 25 psia, and a temperature of about 100° F. The scrubber removes carbon dioxide at a flow rate of about 71,882 lbs. per hr. from the off-gas feed.

The remaining stream derived from the scrubber, now rich in comustibles, has a flow rate of about 14,848 lbs/hr., atmospheric pressure and a temperature of about 100° F. and is next fed to a compressor. The compressor with a work input of about $5.126 \times 10^6$ BTU per hour, compresses the stream to a pressure of about 238.9 psia and a temperature of about 523° F.

The compressed stream is next fed to an air intercooler, requiring a work input of about $4.906 \times 10^6$ BTU per hour. The air intercooler reduces the initial temperature of the stream to about 120° F. and is subsequently fed to a distillation column contained in a cold box for effecting a cryogenic separation of hydrogen sulfide and gaseous components of similar critical temperature such as ammonia, from the remaining clean combustibles. The distillation column is associated with a reflux condenser for completing the separation of hydrogen sulfide and ammonia from the clean combustible gases, which are subsequently stored in a dewar vessel.

The gas stream from the reflux condenser, now at a temperature of about 46.4° F. and a pressure of about 230 psia is flowed to an expander, where part of the work of compression is recovered. The expander recovers about $1.598 \times 10^6$ BTU per hour, and the resultant stream now at −171° F. and about 25 psia pressure is fed back through the reflux condenser through the cold box to a turbine air cooler.

The clean combustible stream comprising hydrogen, methane and nitrogen at about 20 psia and a temperature of about −2.9° F. is fed through the air cooler to a gas turbine compressor. Air is fed to the turbine air cooler at a flow rate of about $543.86 \times 10^3$ lbs/hr. and a temperature of about 76.2° F. The gas turbine compressor with a work input of about $3.15 \times 10^6$ per hour compresses the clean combustible stream to a pressure of about 217.6 psia at a temperature of about 319.7° F. and is then flowed to a combustion chamber. A supply of air from the turbine air cooler at a temperature of about 59° F. is compressed through a second compressor and also fed to the combustion chamber.

The energy from combustion of clean combustibles is used to drive a gas turbine engine hooked to electrical generators thereby producing about 15 MWe. The gases from the turbine engine at a flow rate of about $550.466 \times 10^3$ lbs hr. at atmospheric pressure and a temperature of about 865° F. are fed to a waste heat exchanger where available heat energy is recovered at about $39.2 \times 10^6$ BTU per hour. The waste gases from the heat exchanger now at a pressure of about 10 psia and temperature of about 370° F. are fed to an induced draft fan and ducted to a stack for release to the atmosphere.

The stored hydrogen sulfide and ammonia liquids from the dewar vessel at a temperature of about 46.4° F. and a pressure of about 238.9 psia are flowed through the turbine air cooler, where part of the work is recovered. The stream exits the turbine air cooler at a temperature of about 65° F. and 230 psia and is then fed to an expander for recovering remaining work of compression estimated to be $541 \times 10^3$ BTU per hour. The stream from the expander now at a temperature of about −137.6° F. and a pressure of about 25 psia is fed back through the turbine air cooler, which results in a temperature for the stream of about 65° F. and a pressure of about 20 psia.

The hydrogen sulfide stream is thereafter fed to a combustion unit having a heat exchanger and fluidized bed scrub, for converting hydrogen sulfide to sulfur dioxide by combustion and for effecting removal of $SO_2$ from the waste gases. Air is fed to the heat/exchanger fluidized bed combustion unit at a flow rate of about $56.4 \times 10^3$ lbs/hr. The bed make-up to the combustion unit is typically at 11.73 TPH and the expended bed material is typically at 14.3 TPH from the heat exchanger fluidized bed unit. The exhaust gases are fed from the unit at a flow rate of about $58.5 \times 10^3$ lbs/hr. and a temperature of about 400° F. to a stack for release to the atmosphere.

Those skilled in the art, of course, will appreciate that the sour gas feed stream to the inventive method should have a relatively low moisture content. Accordingly, if such stream has a relatively high moisture content, drying of the stream should be effected to reduce the moisture level to below about 1% by weight before processing.

Thus, in accordance with the invention, a combination of cryogenic, gas turbine, and fluid bed technology provides an added generation capability derived from the sour gas, thereby turning $H_2S$ abatement into an asset.

Further disclosure regarding details of the process apparatus mentioned herein may be had by reference to "Chemical Engineers' Handbook", edited by Perry, Chilton and Kirkpatrick, 5th Edition published by McGraw-Hill Book Company which is hereby incorporated by this reference.

While the preferred form of the invention has been disclosed, it is appreciated that modification may be made herein without departing from the broad concept. Consequently, this patent is not to be restricted to the particular form or arrangement of processing steps herein described and shown except as limited by the claims.

I claim:

1. A method for removal of hydrogen sulfide from a sour gas stream containing hydrogen sulfide, combustible and non-combustible gaseous components, the method comprising the steps of:
   (a) scrubbing a majority of said non-combustible gaseous components from said sour gas stream;
   (b) compressing the remainder of said stream derived from step (a) to a pressure within a range of from about 230 psia to about 250 psia;
   (c) effecting a separation by cryogenic liquifaction of hydrogen sulfide and gaseous components of similar critical temperature from said stream derived from step (b) and storing the separated hydrogen sulfide and gaseous components of similar critical temperature in an insulated storage vessel;
   (d) expanding the unstored remainder of said stream derived from step (c) in an adiabatic manner to substantially recover available work of compression from said stream;
   (e) combining the expanded stream derived from step (d) with air and effecting combustion thereon in a combustion unit whereby resultant energy is utilized to drive a gas turbine engine;
   (f) flowing the stored hydrogen sulfide and gaseous components of similar critical temperature derived from step (c) through an expander to substantially recover available work of compression; and
   (g) combining the expanded hydrogen sulfide and gaseous components of similar critical temperature derived from step (f) with air and effecting combustion thereof in a combustion unit having a fluidized bed scrub, to substantially convert hydrogen sulfide to sulfur dioxide and to scrub said sulfur dioxide from resultant combustion gases.

2. The method of claim 1 wherein said sour gas stream comprises hydrogen sulfide, ammonia, carbon dioxide, hydrogen, methane and nitrogen.

3. The method of claim 1 wherein said cryogenic liquification is effected by flowing said stream derived from step (b) to an air intercooler, thereafter flowing said stream to a distillation column contained within a cold box and thereafter flowing said stream to a reflux condenser to complete separation and liquification of hydrogen sulfide and components of similar critical temperature with resultant liquid recycled to said distillation column.

4. The method of claim 1 wherein step (d) is effected in an expander and the exhaust from said expander is subsequently isentropically expanded through said reflux condenser and flowed to an insulated storage vessel for maintaining the hydrogen sulfide and components of similar critical temperature in a liquid state.

5. The method of claim 1 wherein step (e) comprises first flowing the expanded stream through a turbine inlet air cooler to isentropically recover remaining energy of compression and subsequently flowing the stream through a fuel compressor before effecting combustion.

6. The method of claim 1 and further including the step of flowing exhaust gases derived from said gas turbine engine to a waste heat exchanger to recover available heat energy.

7. The method of claim 5 wherein step (f) includes flowing said stored hydrogen sulfide and gaseous components of similar critical temperature through said turbine inlet air cooler to recover a portion of available compression energy and to cause the liquid mixture to flash back to a gaseous state.

8. The method of claim 5 wherein said stream obtained from said turbine inlet air cooler is flowed through an expander and subsequently recycled to said turbine inlet air cooler to recover remaining work of compression.

9. The method of claim 1 wherein said fluidized bed scrub defined in step (g) comprises a bed material selected from the group consisting of limestone, dolomite, magnesium oxide and mixtures thereof.

10. The method of claim 1 and further including the step of drying said sour gas stream before processing to a moisture level of below about 1% by weight.

* * * * *

UNITED STATES PATENT AND TRADEMARK OFFICE
CERTIFICATE OF CORRECTION

PATENT NO. : 4,285,917
DATED : August 25, 1981
INVENTOR(S) : Stuart R. Knight

It is certified that error appears in the above-identified patent and that said Letters Patent are hereby corrected as shown below:

Column 1, line 45, after "penditure" insert --The present invention fulfills this need.--;

Column 3, line 55, delete "amonia" and insert therefor --ammonia--;

Column 4, line 13, delete "liquification" and insert therefor --liquifaction--;

Column 6, line 18, delete "lbs hr" and insert therefor --lbs/hr--;

Column 8, line 5, delete "liquification" and insert therefor --liquifaction--;

Column 8, line 9, delete "liquification" and insert therefor --liquifaction--.

Signed and Sealed this

Nineteenth Day of January 1982

[SEAL]

Attest:

*Attesting Officer*

GERALD J. MOSSINGHOFF
*Commissioner of Patents and Trademarks*